June 16, 1964

C. W. CHANCELLOR, JR 3,137,524

SEAT WITH AUXILIARY BACK REST HAVING SINGLE PIVOT SPRING ASSEMBLY

Filed April 16, 1962

Charles W. Chancellor Jr.
INVENTOR.

BY
Attorneys

June 16, 1964 C. W. CHANCELLOR, JR 3,137,524
SEAT WITH AUXILIARY BACK REST HAVING
SINGLE PIVOT SPRING ASSEMBLY
Filed April 16, 1962 2 Sheets-Sheet 2

Charles W. Chancellor, Jr.
INVENTOR.

BY
Attorneys

United States Patent Office 3,137,524
Patented June 16, 1964

3,137,524
SEAT WITH AUXILIARY BACK REST HAVING SINGLE PIVOT SPRING ASSEMBLY
Charles W. Chancellor, Jr., Box 15, Midland, Tex.
Filed Apr. 16, 1962, Ser. No. 187,892
3 Claims. (Cl. 297—284)

The present invention generally relates to seats, and more particularly to a seat having an auxiliary adjustable back rest incorporated therein adapted to closely conform to the lower portion of the back of the occupant of the seat. One of the primary objections of the present invention is the provision of an auxiliary backrest capable of being easily incorporated in various types of seats encountered in household furniture, construction equipment, automobiles, commercial vehicles, aircraft, and various types of marine vehicles.

Another significant object of the present invention involves the provision of an auxiliary backrest which can be adjusted both as to height and angular position so as to enable the occupant of the seat to adjust the backrest to his particular specification.

Further, an object of the present invention is the provision of a backrest which is resiliently mounted for pivotal movement about a single point thereby enabling a slight giving of the backrest upon being contacted by the back of the occupant of the seat.

Also, an object of the present invention involves the provision of a device which is relatively simple in construction, comprising essentially two parallel rails interconnected by a U-shaped member pivoted at one end to the rails and biased thereagainst by an adjustable spring means. The device further includes a mounting plate mounted on and adjustable relative to the U-shaped member with the mounting plate having an upstanding support arm adjustably secured thereto and provided at its other end with a back engaging cushion.

Likewise, an object of the present invention involves the provision of a device which is relatively inexpensive to manufacture, extremely durable because of the use of a minimum amount of moving parts, easy to adjust, and compact in design.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
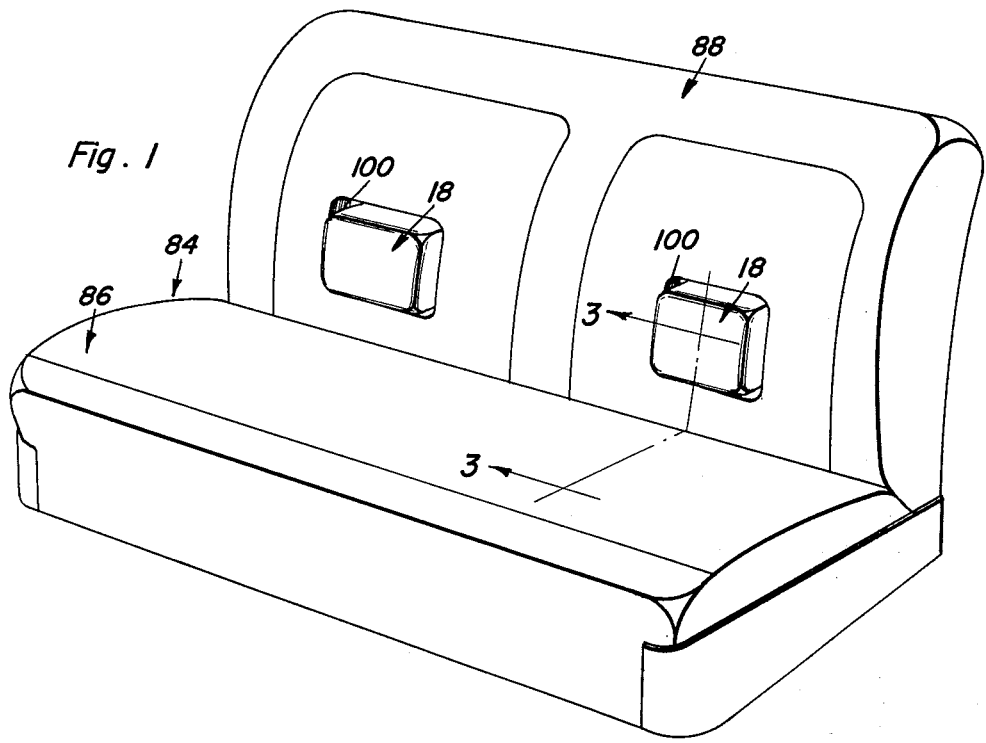
FIGURE 1 illustrates a perspective view of the auxiliary backrest incorporated into an automobile seat.

Referring now more particularly to the drawings, reference numeral 10 generally designates the auxiliary backrest comprising the present invention. This backrest can consist basically of a spring assembly 12, a mounting plate 54, a support arm 16, and a back support 18.

Figure 2:
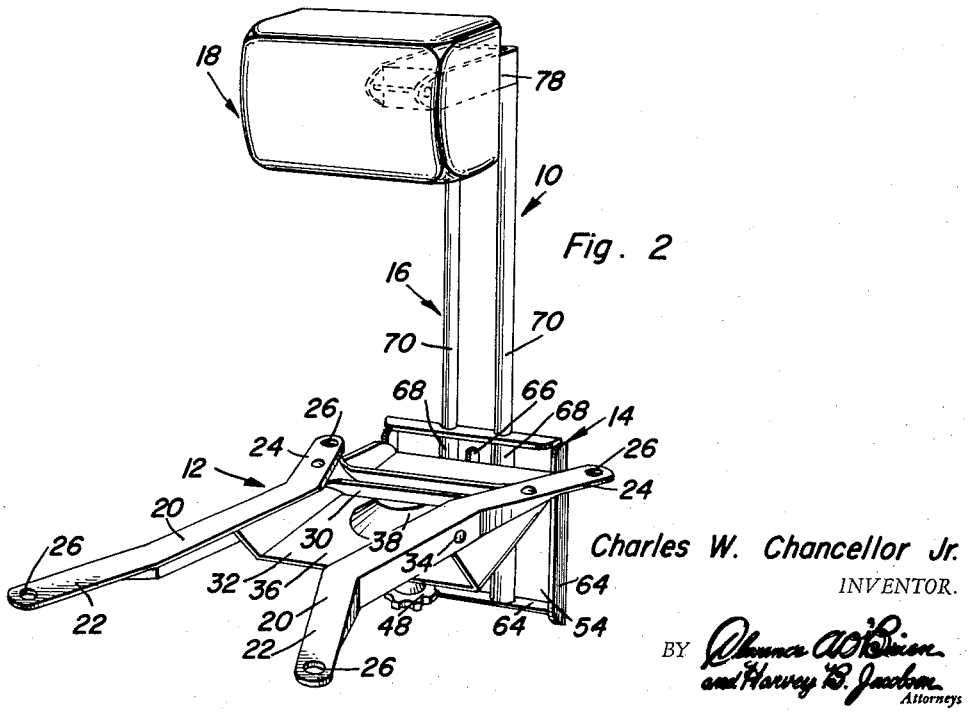
FIGURE 2 is a perspective view of the backrest comprising the present invention.
Figure 3:
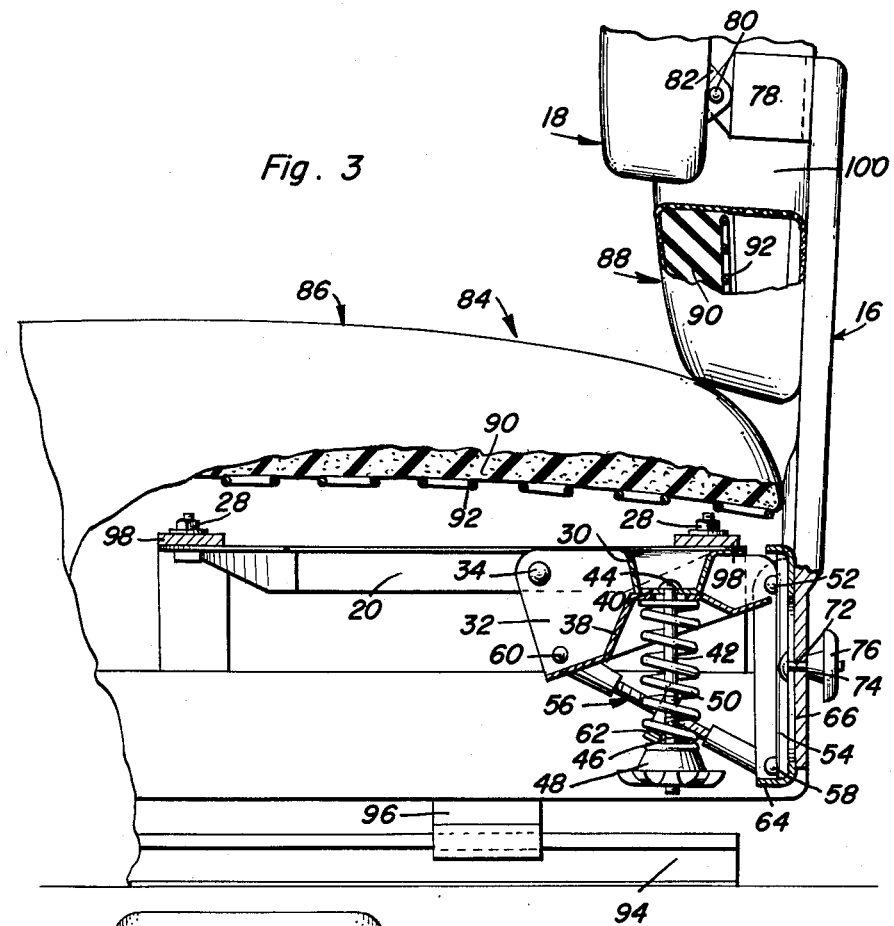
FIGURE 3 is a partial cross sectional view taken substantially on a plane passing along line 3—3 in FIGURE 1 and illustrating the manner in which the backrest is mounted.

The spring assembly 12 comprises two elongated parallel side rails 20 being substantially angular in cross section and provided at both ends with outwardly diverging portions 22 and 24 which are provided with apertures 26 therethrough through which fastening means 28 extend so as to secure the spring assembly to the bottom portion of a seat in the manner illustrated in FIGURE 3. The side rails 20 are fixedly secured together by an upwardly opening channel member 30 fixedly secured to the side rails 20 adjacent their inner diverging ends 24. An upwardly opening U-shaped member 32 also extends between the side rails 20 and is pivotally secured thereto by two pivot pins 34, one extending through each upstanding leg of the U-shaped member 32 and the corresponding depending side of the adjacent side rail 20. As seen in FIGURES 2 and 3, the bight portion 36 of the U-shaped member is provided with an upwardly extending protrusion 38 in line with the adapted to contact the bight portion 40 of the channel member 30.

A rod 42 provided with a headed end 44 is secured to the bight portion 40 of the channel member 30 and extends therefrom through the upwardly extending protrusion 38 of the U-shaped member 32. The lower end of the rod 42 is provided with a threaded exterior 46 for the adjustable reception of an adjusting hand wheel 48 being provided for adjusting the compression in a coil compression spring 50 mounted between the hand wheel 48 and the bottom of the protrusion 38. This compression spring 50 is specifically provided for forming a resilient resistance against movement of the U-shaped member 32 about the pivot pins 34.

Pivotally secured to the rear of the U-shaped member 32 by a pair of pivot pins 52 is a mounting plate 54, the lower end of which is pivotally attached to a turnbuckle assembly 56 by means of a pivot pin 58. The upper end of the turnbuckle 56 is pivotally secured to the lower forward end of the U-shaped member 32 by means of a pivot pin 60, and, the entire turnbuckle assembly is adapted to adjustably fix the angular position of the mounting plate 54 relative to the U-shaped member 32, with a hand wheel 62 for the adjustment of the turnbuckle assembly 56. The mounting plate 54, in addition to being provided with inwardly extending peripheral flanges 64, and a vertically extending slot 66, is also provided with two vertically extending grooves 68 intended to further rigidify the mounting plate 54 and additionally provide means for interlocking engagement with corresponding ribs 70 on the support arm 16.

The lower end of the support arm 16 is adjustably secured to the mounting plate 54 by means of a threaded bolt 74 extending through the slot 66 in the mounting plate 54 and through a hole 72 in the lower end of the support arm 16. Bolt 74 has an adjusting hand wheel 76 threaded on its outer end so as to fixedly secure the support arm 16 to the mounting plate 54 in an adjusted position.

The upper end of the support arm 16 has an inwardly extending bracket 78 fixedly secured thereto with a back supporting cushion 18 pivotally secured thereto by means of a transversely extending pivot pin 80. The back support 18 preferably includes a bracket means 82 fixedly secured to the rear side thereof for effecting the above noted pivotal connection to the forwardly extending bracket means 78. In regard to this pivotal connection between the back support 18 and the bracket 78, it is preferred that the frictional resistance in the connection be sufficient so as to maintain the back support 18 in its adjusted position in the absence of any outside application of force, while at the same time enabling the adjustment of this support cushion upon contact therewith by the back of the occupant of the seat.

Referring now particularly to FIGURE 3, the manner of mounting the auxiliary backrest 10 of the present invention on an automobile seat becomes readily apparent. This automobile seat, generally referred to by reference numeral 84 includes a conventional seat portion 86 and back portion 88 both including a cushion portion 90 generally supported on a spring network 92. The seat 84 itself is in most instances adjustably supported on a floor rail 94 by means of depending brackets 96. In order to secure the auxiliary backrest 10 of the present invention to the seat 84, a pair of transverse supporting bars 98 are provided and secured to the seat 84 in a conventional manner such as by bolting or welding. The device 10 is then secured to the supporting bars 98 by means of the fasteners 28 extending through the apertures 26 in the side rails 20 and through aligned apertures within supporting bars 98. It will be noted that the backrest 10 is positioned so that the forward face of the support arm 16 is flush with the rear surface of the back portion 88 of the seat 84 with an aperture 100 being provided in the back portion 88 for the reception of the back supporting cushion 18 pivotally connected to the bracket 78 fixedly secured to the upper end of the support arm 16. It will also be noted that the opening 100 is of a size sufficient so as to allow for the pivotal adjustment of the back support cushion 18 in addition to the vertical adjustment of the support arm 16 by means of the bolt 74 and slot 66. FIGURE 1 is of particular significance for its illustration of the manner in which two auxiliary backrests can be oriented so as to accommodate two occupants.

Figure 4:
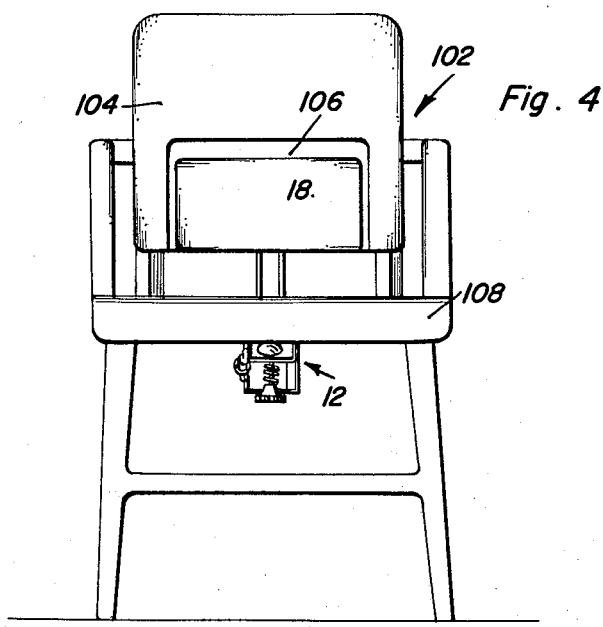
FIGURE 4 illustrates a modified use of the auxiliary backrest of the present invention wherein the backrest is mounted on a conventional chair.

FIGURE 4 illustrates an adaptation of the auxiliary backrest 10 of the present invention to a conventional household chair 102 with the back 104 of the chair 102 being provided with an enlarged recess 106 for the reception of the back supporting cushion 18. The spring assembly 12 is shown positioned beneath the seat portion 108 and secured thereto in substantially the same manner as illustrated in FIGURE 3.

From the foregoing, it is readily apparent that a novel auxiliary backrest has been defined, which backrest is resiliently biased and adjustably mounted by means of a single pivot spring assembly so as to comfortably accommodate the lower back of the occupant of a wide range of different types of seats in marine, land and air vehicles in addition to the common household chair.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a seat having a seat portion and a back portion, said back portion having an enlarged aperture therethrough, an auxiliary backrest, said backrest including a spring assembly secured to the seat portion, a back support cushion, means mounting said cushion on said spring assembly, said spring assembly resiliently biasing said back support cushion forwardly through said enlarged aperture, said spring assembly including a pair of elongated parallel side rails, said side rails being secured to the bottom of said seat portion with the rear ends of said rails being substantially in line with the rear of said seat portion, a transverse bracket means fixedly secured between the rear portions of said rails, a transverse member underlying said bracket means, means pivotally securing said transverse member to said rails forward of said bracket means, and spring means resiliently urging said transverse member upwardly toward said bracket means about said pivotal securing means, said means mounting said cushion on said spring assembly including a mounting plate depending from and pivotally secured to the rear end of said member, means adjustably interconnecting the lower end of the mounting plate and the transverse member for fixing said mounting plate in a predetermined pivoted location about the rear end of said member, a substantially vertical support arm positioned juxtaposed the rear of the seat back portion, means adjustably securing said support arm to said mounting plate, and a forwardly extending bracket fixed to the upper end of the support arm, said cushion being mounted on the forward end of said forwardly extending bracket.

2. A single pivot auxiliary backrest assembly adapted to be secured to a vehicle seat, said assembly comprising a pair of spaced parallel mounting rails, a transverse bracket means extending between and secured to the rear portions of said rails, a transverse member pivotally secured to said rails forward of said bracket means, said transverse member being of greater width than said bracket means and underlying said bracket means, a rod fixedly secured to said bracket means, said rod extending through said transverse member, a compression coil spring mounted on said rod beneath said member, said spring resiliently urging said member upwardly against said bracket means, means for adjusting the compression of said spring, a mounting plate oriented in a substantially vertical direction and adjustably secured to the rear end of said transverse member, a vertically extending support arm adjustably mounted on said mounting plate for vertical adjustment relative thereto, and a forwardly extending back supporting cushion mounted on the upper end of said support arm, said support cushion being resiliently biased forwardly by the upward urging of the coil spring.

3. An auxiliary backrest assembly adapted to be secured to a seat assembly, said auxiliary backrest assembly comprising a pair of spaced mounting rails, transverse bracket means extending between and affixed to the rails, a transverse member pivotally mounted on said rails and underlying said bracket means for swinging movement toward and away from the bracket means, adjustable spring means resiliently interconnecting the bracket means and the transverse member for resiliently urging said transverse member upwardly toward said bracket means, a substantially vertically disposed mounting plate mounted on the end of said transverse member, a support arm extending upwardly from and being adjustably connected to said mounting plate, and a forwardly extending back supporting member mounted on the upper end of said support arm whereby the resilient means will resiliently bias the back supporting member towards the mounting rails due to the resilient action of the spring means.

References Cited in the file of this patent
UNITED STATES PATENTS
180,548    Chichester _____ Aug. 1, 1876